(12) United States Patent
Butt et al.

(10) Patent No.: US 7,094,301 B2
(45) Date of Patent: Aug. 22, 2006

(54) METHOD OF FORMING A JOINT

(75) Inventors: Darryl Paul Butt, Gainesville, FL (US); Raymond Ashton Cutler, Bountiful, UT (US); Steven Walton Rynders, Riverton, UT (US); Michael Francis Carolan, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 375 days.

(21) Appl. No.: 10/393,564

(22) Filed: Mar. 21, 2003

(65) Prior Publication Data

US 2004/0182306 A1  Sep. 23, 2004

(51) Int. Cl.
*B32B 9/00* (2006.01)
*C03B 29/00* (2006.01)

(52) U.S. Cl. .................. 156/89.11; 428/701; 428/697; 428/699; 428/702; 423/593.1; 423/594.1; 423/594.16; 423/594.2; 423/594.5; 423/604; 423/594.6; 423/632; 423/635; 423/594.19; 432/13; 264/1.21; 264/1.22; 264/248; 264/671

(58) Field of Classification Search .......... 156/89.11; 432/13; 264/1.21, 1.22, 248, 671; 423/593.1, 423/594.1, 594.16, 584.2, 594.5, 594.6, 604, 423/632, 635, 594.19; 428/697, 699, 701–702
See application file for complete search history.

(56) References Cited

OTHER PUBLICATIONS

B. H. Rabin and G. A. Moore "Reaction Processing and Properties of SiC-to-SiC Joints", Material Res. Soc. Symp. Proc., vol. 314, (1993), pp. 197-203.

S. D. Peteves et al., "The reactive route to ceramic joining: fabrication, interfacial chemistry and joint properties", Acta mater. vol. 46, No. 7, (1998),pp. 2407-2414.

Y. Iino, "Partial transient liquid-phase metals layer technique of ceramic metal bonding", J. of Mat. Sci. Lett. 10, (1991), pp. 104-106.

S. Serkowski, "Application of ceramic-metal eutectics for solid-state bonding between ceramics," Int. Symp. Ceram. Mater. Compon. Engines, 4$^{th}$ (Roger Carlsson et al. eds.) (1992) pp. 348-355.

M. Neuhauser et al. "Fugen von Technischen Keramiken mit Keramik-Grunfolien," Ber. DGK, vol. 72, No. 1-2, (1995) pp. 17-20.

D. Seifert et al. "Verbind poroser mit dichtgesinterter $Al_2O_3$-Keramik durch Fugen mit keramischen Folien," Ber. DGK, vol. 73, No. 10 (1996) 585-589.

R. Chaim et al. "Joining of alumina ceramics using nanocrystalline tape cast interlayer," J. of Materials Research, 15, (2000) pp. 1724-1728.

Y. Zou et al., "Modelling of transient liquid phase bonding," Int. Mat. Rev. vol. 40, No. 5, (1995), p. 181.

I. Tuah-Poku et al., "Study of the Transient Liquid Phase Bonding, etc.," Metallurgical Transactions A vol. 19A, Mar. 1988, p. 675.

*Primary Examiner*—Ling Xu
(74) *Attorney, Agent, or Firm*—Keith D. Gourley (57) ABSTRACT

A method of joining at least two sintered bodies to form a composite structure, including providing a first multicomponent metallic oxide having a perovskitic or fluorite crystal structure; providing a second sintered body including a second multicomponent metallic oxide having a crystal structure of the same type as the first; and providing at an interface a joint material containing at least one metal oxide containing at least one metal identically contained in at least one of the first and second multicomponent metallic oxides. The joint material is free of cations of Si, Ge, Sn, Pb, P and Te and has a melting point below the sintering temperatures of both sintered bodies. The joint material is heated to a temperature above the melting point of the metal oxide(s) and below the sintering temperatures of the sintered bodies to form the joint. Structures containing such joints are also disclosed.

26 Claims, 6 Drawing Sheets

METHOD OF FORMING A JOINT

STATEMENT REGARDING FEDERALLY SPONSORED RESEARCH OR DEVELOPMENT

This invention was made at least in part with funding from the United States Department of Energy under program DE-FC26-97FT96052. The United States Government has certain rights in this invention.

BACKGROUND OF THE INVENTION

The present invention relates to a method of forming a joint at an interface between two sintered bodies comprising multicomponent metallic oxides of specific crystal structure. When employing such sintered bodies in a device such as an oxygen separation device, it is often mandatory to join the same securely or even to provide a gas-tight joint, said joint being required to withstand operation conditions of the device. Typical sintered bodies in the above devices are an ion transport membrane (an electrolyte), an interconnect, a support, ceramic tubes, seals and conduits, etc. Such sintered bodies are typically joined tube-to-tube, tube-to-flat-plate and flat-plate to flat-plate, respectively.

Any joint is likely to form the weakest point of the entire device. Weak points are critical in cases where the device is subjected to severe operation conditions such as high temperature, high pressure differences or highly oxidizing or reducing environments which are tolerated by the sintered bodies themselves. To provide a commercially viable device, the joint is thus likewise required to maintain mechanical integrity, compatibility with the sintered bodies- and gas-tightness even when subjected to the operating conditions. Accordingly an ideal joint would possess comparable chemical and mechanical properties as the materials to be joined, especially comparable thermal cycling stability.

Up to now, joints between sintered bodies have been formed by using metallic brazes, nanocrystalline oxides, oxide-metal eutectics, glasses and ceramic-glass composites. See, e.g., S. D. Peteves et al., "The reactive route to ceramic joining: fabrication, interfacial chemistry and joint properties", Acta mater. Vol. 46, No. 7, (1998), pp. 2407–2414; Y. Iino, "Partial transient liquid-phase metals layer technique of ceramic metal bonding", J. of Mat. Sci. Lett. 10, (1991), pp.104–106; S. Serkowski, "Application of ceramic-metal eutectics for solid-state bonding between ceramics," Int. Symp. Ceram. Mater. Compon. Engines, 4th (Roger Carlsson et al. eds.) (1992) pp. 348–355; M. Neuhauser et al. "Fugen von Technischen Keramiken mit Keramik-Grunfolien," Ber. DGK, Vol. 72, No.1–2, (1995) pp. 17–20; D. Seifert et al. "Verbind poroser mit dichtgesinterter $Al_2O_3$-Keramik durch Fugen mit keramischen Folien," Ber. DGK, Vol. 73 No.10 (1996) 585–589; and R. Chaim et al. "Joining of alumina ceramics using nanocrystalline tape cast interlayer," J. of Materials Research, 15, (2000) pp. 1724–1728. Joining of sintered bodies using ceramic-metal eutectics has the disadvantage of requiring the use of a metal. Many metals oxidize in air at high temperatures and therefore require the use of special reducing atmospheres to prevent the formation of a metal oxide. The sintered bodies to be joined may not be stable in these reducing atmospheres, which would result in decomposition of the sintered bodies. Joining of sintered bodies using nanocrystalline interlayers has the disadvantage of requiring very high pressures that could damage the parts to be joined due to creep or even fracture.

The use of brazes, i.e., metallic materials, or glasses, i.e., solid solutions of multicomponent metallic oxides, has the disadvantage of leaving behind an interfacial phase of the joint material with properties differing from, and in most cases inferior to, those of the materials being joined. For example, brazes leave behind a ductile metal, which at elevated temperatures can creep, be incompatible with the surrounding ceramic materials, or oxidize. Similarly, glass joints may have significantly different thermal expansion coefficients compared with surrounding multicomponent metallic oxides having perovskitic or fluoritic structure, resulting in undesirable residual stresses following temperature changes. Glass joints will further soften and flow at temperatures above their respective glass transition temperature. Finally, glass joints can be chemically incompatible with a sintered body of perovskitic or fluoritic structure at elevated temperatures. In any case, due to the remaining material, the joint will inevitably be visually or microscopically detectable, its properties being determined by the material of the joint itself, not the bodies to be joined.

Another method of forming a joint is disclosed in B. H. Rabin, and G. A. Moore "Reaction processing and properties of SiC-to-SiC joints", Material. Res. Soc. Symp. Proc. 314, (1993), 197–203, Material Research Society, Pittsburgh. In this document it is disclosed that SiC components can be joined by using a mixture of Si and C powders. The document is silent on joining oxides in general, and especially on joining of multicomponent metallic oxides having fluoritic or perovskitic structure.

D. Seifert et al. "Verbind poroser mit dichtgesinterter $Al_2O_3$-Keramik durch Fugen mit keramischen Folien," Ber. DGK, Vol. 73 No. 10 (1996) 585–589, discloses a method to join alumina ceramics using ceramic joining foils of alumina-titania-calcia-magnesia. Other joining foils of alumina-titania-calcia-magnesia-silica and alumina-titania-manganese oxide-iron oxide-silica are also described. The joining temperature was greater than 100° K lower than the sintering temperature of the alumina ceramics to be joined. These joining compositions formed a liquid phase upon heating to the joining temperature. After joining, the joint retained the composition of the joining foils and was compositionally different than the alumina bodies that were joined. This reference states that the joining compositions to be used are highly specific to the ceramics to be joined. This reference is silent on how to join multicomponent metallic oxides. It is specifically silent on how to join perovskitic multicomponent oxides.

Another method to join alumina ceramics is disclosed in M. Neuhauser et al. "Fugen von Technischen Keramiken mit Keramik-Grunfolien," Ber. DGK, Vol. 72, No.1–2, (1995) pp. 17–20. This method requires the use of ceramic foils made from a mixture of alumina, silica and other oxides. The presence of silica is undesirable since silica can be chemically or mechanically incompatible with the ceramics to be joined. In addition, this reference is also silent on how to join multicomponent metallic oxides.

A third method to join alumina parts using a $(Al,Cr)_2O_3$—Cr eutectic joining mixture is disclosed in S. Serkowski, "Application of ceramic-metal eutectics for solid-state bonding between ceramics," Int. Symp. Ceram. Mater. Compon. Engines, 4th (Roger Carlsson et al. eds.) (1992) pp. 348–355. To obtain the joint, special gas atmospheres to produce extremely low oxygen partial pressures were required to allow the joining mixture to melt. The requirement of these special gas atmospheres limits the ceramics with which the eutectic mixtures can be used. Many ceramics will not be stable under the low oxygen partial pressure conditions needed for the eutectics to melt. Also the eutectic joining mixtures will result in the joint material being chemically and mechanically dissimilar to the bodies to be joined. This will have a negative effect of the stability and integrity of the joint. In addition, this reference is silent on joining multicomponent metallic oxides.

A fourth method to join alumina is disclosed in R. Chaim et al. "Joining of alumina ceramics using nanocrystalline tape cast interlayer," J. of Materials Research, 15, (2000) pp. 1724–1728. This method requires hot pressing the alumina parts to be joined under uniaxial pressures of 55–80 MPa at 1200–1300° C. This method has the alleged advantage that the joint material is chemically and mechanically identical to the parts to be joined. However, the high pressures necessary to produce the joint are undesirable since the high pressures can lead to fracture or creep of the ceramic parts to be joined. In addition, this reference is also silent on how to join multicomponent metallic oxides.

In metallurgy, another type of bonding has been developed recently which is the so-called transient liquid phase bonding (TLP). See, e.g., Y. Zou et al., "Modelling of transient liquid phase bonding", Int. Mat. Rev. Vol. 40, No. 5, (1995), p. 181, and I. Tuah-Poku et al., "Study of the Transient Liquid Phase Bonding, etc.", Metallurgical Transactions A Vol. 19A, March 1988, p. 675. This process relies on the transient formation of a liquid phase depending on solute diffusion. The bonding technology has exclusively been used on metallic bodies.

It is therefore desired to provide a method of forming a joint between a first sintered body comprising a first multicomponent metallic oxide having a crystal structure of the perovskitic or fluoritic type and a second sintered body comprising a second multicomponent metallic oxide having a crystal structure of the same type as the first multicomponent metallic oxide, which method allows for formation of a joint that is chemically and mechanically compatible with the first and second sintered bodies. It is further desired that the formation of the joint does not leave behind a distinguishable interfacial phase. It is still further desired that the method should further allow for forming a compatible, refractory interfacial phase or joint, especially a joint exhibiting comparable thermal cycling stability.

It is also desired to provide a method of forming a joint between the above first and second sintered bodies, wherein the joint has similar chemical and mechanical properties as the sintered bodies to be joined or where the joint, if present in form of an additional phase, may even have a similar chemical composition and similar crystal structure as the first and second sintered bodies.

All references cited herein are incorporated herein by reference in their entireties.

BRIEF SUMMARY OF THE INVENTION

Accordingly, the invention provides a method of joining at least two sintered bodies to form a composite structure, said method comprising:

providing a first sintered body comprising a first multicomponent metallic oxide having a first crystal structure selected from the group consisting of a perovskitic structure and a fluorite structure;

providing a second sintered body comprising a second multicomponent metallic oxide having a second crystal structure identical to the first crystal structure;

applying at an interface between the first sintered body and the second sintered body a joint material comprising at least one metal oxide, wherein (i) the at least one metal oxide comprises at least one shared metal contained in at least one of the first multicomponent metallic oxide and the second multicomponent metallic oxide; (ii) the joint material is free of boron, silicon, germanium, tin, lead, arsenic, antimony, phosphorus and tellurium; and (iii) the at least one metal oxide has a melting point below a lower of a first sintering temperature of the first multicomponent metallic oxide and a second sintering temperature of the second multicomponent metallic oxide;

heating the first sintered body, the second sintered body and the joint material to a joining temperature above the melting point and below the lower of the first sintering temperature and the second sintering temperature for a period of time sufficient to form a joint between the first sintered body and the second sintered body and thereby provide the composite structure.

In a preferred embodiment, a third multicomponent metallic oxide having a crystal structure of the same type as the first and the second multicomponent metallic oxide sintered bodies is formed at the interface.

The invention further relates to a composite structure comprising two sintered bodies as defined above joined by the method of the invention. Preferably such a device is a device for separating oxygen from a gaseous mixture containing oxygen.

DETAILED DESCRIPTION OF THE INVENTION

In a first aspect, the present invention relates to a method of forming a joint between a first sintered body comprising a first multicomponent metallic oxide having a crystal structure of the perovskitic or the fluorite type and a second sintered body comprising a second multicomponent metallic oxide having a crystal structure of the same type as the first multicomponent metallic oxide.

Similar technology is disclosed in two copending applications filed on even date herewith, one entitled "METHOD OF JOINING ITM MATERIALS USING A PARTIALLY OR FULLY-TRANSIENT LIQUID PHASE", and having the Ser. No. 10/393,954, and the other entitled "PLANAR CERAMIC MEMBRANE ASSEMBLY AND OXIDATION REACTOR SYSTEM", and having the Ser. No. 10/394,620.

The above first and second sintered bodies are joined by (i) providing at the interface of the sintered bodies, where the joint is to be formed, a joint material comprising a metal oxide or mixture of metal oxides, (ii) heating the sintered bodies and the joint material, and (iii) holding at the heating temperature to react the metal oxide or mixture of metal oxides, or part thereof, to form the joint. Reaction may result in a third multicomponent metallic oxide having a crystal structure of the same type as the first and the second multicomponent metallic oxide being formed. Reaction may also result in formation of a joint without any noticeable phase being formed at the interface.

Upon heating in step (ii) a liquid phase is provided by the joint material. This liquid phase then reacts in step (iii) to form the joint, and may hence be called a transient liquid phase. The present invention thus relies on this transient liquid phase and sintering for formation of the joint. Transient liquid phase sintering has previously been used for densification of sintered materials, see, e.g., L.A. Chick et al., "Phase Transitions and Transient Liquid-Phase Sintering in Calcium-substituted Lanthanum Chromite", J. Am. Ceram. Soc. 80(8), (1997), pp. 2109–2120; R. N. Lumley and G. B. Schaffer, "The Effect of Solubility and Particle Size on Liquid Phase Sintering", Scripta Materialia Vol. 35, No. 5, (1996), pp. 589–595; and C. Hu and T. N. Baker, "An analysis of the capillary force and optimum liquid volume in a transient liquid phase sintering process", Materials Science and Engineering A190, (1995), pp.125–129. Alumina has been joined using joint compounds that form liquid phases upon heating, see, e.g., S. Serkowski, "Application of ceramic-metal eutectics for solid-state bonding between ceramics," Int. Symp. Ceram. Mater. Compon. Engines, 4$^{th}$ (Roger Carlsson et al. eds.) (1992) pp. 348–355; M. Neuhauser et al. "Fugen von Technischen Keramiken mit Keramik-Grunfolien," Ber. DGK, Vol. 72, No.1–2, (1995) pp. 17–20; D. Seifert et al. "Verbind poroser mit dichtgesinterter AI2O3-Keramik durch Fugen mit keramischen Folien," Ber. DGK, Vol. 73 No. 10 (1996) 585–589. The method has, however, not been used for joining of multicomponent metallic oxides.

Upon heating in step (ii) a liquid phase and optionally at least one solid phase, preferably one or two solid phases are provided. Reaction of the liquid phase in step (iii) may be with the at least one solid phase or solid phases and/or with the first and/or second multicomponent metallic oxide. In the course of the reaction, a third multicomponent metallic oxide may be formed at the interface. Alternatively, especially when no solid phase is provided and/or reaction occurs with the first and second sintered body, no additional phase is formed at the interface.

The first and second sintered bodies to be joined by the method of the present invention comprise and preferably consist of a first and a second multicomponent metallic oxide, respectively. These multicomponent metallic oxides each have a crystal structure of the perovskitic or the fluorite type. Further, both the first and the second multicomponent metallic oxide have a crystal structure of the same type. With the expression "the same type," it is meant that in case of a first sintered body of perovskitic structure the second sintered body has perovskitic structure as well. In the case of a first sintered body of a fluorite structure, the second sintered body has a fluorite structure as well and so on. Preferably they are of the same type of substructure, i.e., they are isostructural.

Perovskitic structures include as substructures true perovskites that incorporate a three-dimensional cubic array of octahedra, as well as structures that incorporate a perovskite-like layer or layers, i.e., a two-dimensional array of octahedra arranged in a two-dimensional square array. The octahedra consist of small diameter metal ions coordinated by six anions sites. These octahedra are charge stabilized by larger diameter metal ions. Examples of perovskitic structures include cubic perovskites, brownmillerites, Aurivillius phases and the like. Aurivillius phases, sometimes called lamellar perovskites, consist of layers of perovskite wherein the larger diameter metal cations have, in part or in total, been replaced by layers of another oxide, commonly $(Bi_2O_2)^{2+}$. Brownmillerites are perovskites that have one-sixth of the oxygen ions missing with the resulting oxygen ion vacancies ordered into continuous lines within the crystal. An example is $CaFeO_{2.5}$.

Fluorites are characterized by cation coordination numbers of 8 and anion coordination numbers of 4. The cations are arranged in a cubic close packed array in which the anions occupy tetrahedral sites between the cations. Examples of fluorites include yttria-stabilized zirconia, stabilized bismuth oxide and doped ceria.

Preferably the first and the second multicomponent metallic oxides have common crystal lattice structures of a type selected from the group consisting of fluorite, brownmillerite, Aurivillius phases, and perovskite.

The first and second multicomponent metallic oxides of the first and second sintered body are not required to comprise the same metals. However, according to a preferred embodiment, the first and the second multicomponent metallic oxide comprise at least one, more preferably at least two identical metals. For example, the first multicomponent metallic oxide may belong to the lanthanum calcium ferrite family, whereas the second multicomponent metallic oxide may belong to the lanthanum strontium ferrite family. Both would be perovskites, i.e., multicomponent metallic oxides having a crystal structure of the same type (perovskite) identically comprising the two metals La and Fe. Most preferably both sintered bodies are of the same family, i.e., comprise the same elements.

The joint material may comprise a single metal oxide, a mixture of metal oxides, a single multicomponent metallic oxide, a mixture of multicomponent metallic oxides or mixtures thereof as the metal oxide or mixture of metal oxides. In any case, the joint material forms a liquid phase, which liquid phase reacts to form the joint in step (iii). The mechanism by which the joint material forms the liquid phase includes any means of providing a liquid phase from the joint material, such as melting, phase segregation into a liquid and a solid phase and the like.

The metallic oxide or mixture of metallic oxides can be combined with conventional binders and/or solvents to provide an ink, paste or tape. This ink, paste or tape is then provided as the joint material at the interface. It is particularly preferred to provide the joint material in the form of a tape containing in addition to the metallic oxide(s) at least one organic binder and at least one plasticizer. The resulting "green tape" has sufficient plasticity (even prior to heating) to conform to a shape of the interface between the first sintered body and the second sintered body.

Generally, the joint material used in the method of the invention: (1) comprises a metal oxide or mixture of metal oxides including at least one metal present in at least one of the first and the second multicomponent metallic oxides to be joined; (2) excludes the elements boron, silicon, germanium, tin, lead, arsenic, antimony, phosphorous and tellurium; (3) has a melting point below the sintering temperatures of both sintered bodies, and (4) optionally forms after heating and reacting a third multicomponent metallic oxide having a crystal structure of the same type as the first and the second multicomponent metallic oxide.

In certain embodiments, the joint material shares at least one metal with the first multicomponent metallic oxide, but does not share any metal with the second multicomponent metallic oxide, or vice versa. Preferably, the joint material shares more than one, more preferably at least two metal(s)

with the first and/or second multicomponent metallic oxide, respectively. If present, the third multicomponent metallic oxide formed from the joint material can also comprise at least one, preferably at least two metals, identically contained in the first multicomponent metallic oxide and/or at least one, preferably at least two metals, identically contained in the second multicomponent metallic oxide. The latter two metals can be the same as or different from the former two. To provide the third multicomponent metallic oxide, the joint material likewise comprises at least one, preferably at least two metals identically contained in the first multicomponent metallic oxide and/or at least one, more preferably at least two metals identically contained in the second multicomponent metallic oxide as well.

In a most preferred embodiment the first, the second and, if present, the third multicomponent metallic oxide comprise identical metals, i.e., belong to the same multicomponent metallic oxide family. Even more preferably, all three multicomponent metallic oxides are also identical or very similar with respect to stoichiometric coefficients.

For example, where the first and second multicomponent metallic oxides belong to the lanthanum calcium ferrite family, the third multicomponent metallic oxide formed from the metallic oxide or mixture of metallic oxides used as the joint material after heating and reacting likewise belongs to the lanthanum calcium ferrite family. In this case the joint material may comprise a lanthanum oxide, calcia, iron oxide, and mixtures and mixed oxides thereof.

The joint material is substantially, and more preferably completely, free of cations of elements selected from the group consisting of the glass forming elements boron, silicon, germanium, tin, lead, arsenic, antimony, phosphorous, and tellurium. Multicomponent metallic oxide components comprising these elements are not suitable as joint materials for the method of the invention, since they tend to form oxides with no long range atomic order (glasses) instead of multicomponent metallic oxides having a defined crystal structure. Typical examples of such components are the glass seals used in prior art.

The joint material has a melting point and hence melts below the sintering temperatures of both sintered bodies. The term "melting point" refers to a temperature at which the joint material provides a liquid phase. This can, e.g., be by melting one or more or all of the metal oxide components of the joint material, by phase segregation from the metal oxide(s) or a mixture of both processes. The term does not require all of the joint material to be in liquid state above the melting point, but includes forming a liquid phase and at least one solid phase.

Since formation of the joint should typically not deteriorate the structural integrity of the sintered bodies to be joined, joining is carried out at temperatures below the sintering temperature of these sintered bodies. The term "sintering temperature" as used herein, refers to a temperature at which the density of bodies being sintered starts changing appreciably. Sintering temperatures of various ceramic compositions are known to the skilled worker and/or can be determined by routine measurements. Typical sintering temperatures for an exemplary perovskite such as lanthanum calcium ferrites are in the range of 1350° C. to 1500° C., whereas sintering temperatures for an exemplary fluorite such as gadolinium doped ceria are in the range of 1400° C. to 1600° C. The melting point of the joint material must be sufficiently below these sintering temperatures to allow for heating the sintered bodies and the joint material to a temperature above said melting point of the joint material and below the sintering temperature of the first and the second sintered body. Typically, the melting point of the joint material is at least 50° C., preferably at least about 100° C. and even more preferably about 200° C. lower than the lowest of the sintering temperatures of the first and the second sintered body, respectively.

During heating and/or holding in steps (ii) and (iii) respectively, a pressure is optionally applied to the sintered bodies to be joined to promote joint formation. Generally such pressure may be in the range of up to 1 MPa. Preferably such pressure will be in the range of 1–500 kPa. In certain embodiments, the method is conducted under no applied pressure, or at another pressure insufficient to damage the sintered bodies and the joint.

Upon heating, the liquid phase is provided in a quantity sufficient to allow the seal to form. Hence, by testing joint quality (e.g., gas tightness), the necessary amount of liquid can be determined by the skilled worker. The liquid phase then reacts with any remaining solid phase(s) of the joint material and/or the first and/or second multicomponent metallic oxide of the first and second sintered body, respectively. During the reaction a third multicomponent metallic oxide may be formed at the interface. This is especially advantageous in the case of uneven surfaces, since formation of the third oxide allows for filling voids during joining. Formation of such third oxide is, however, not mandatory. As the reaction proceeds, the liquid phase is consumed and finally vanishes.

Figure 1:
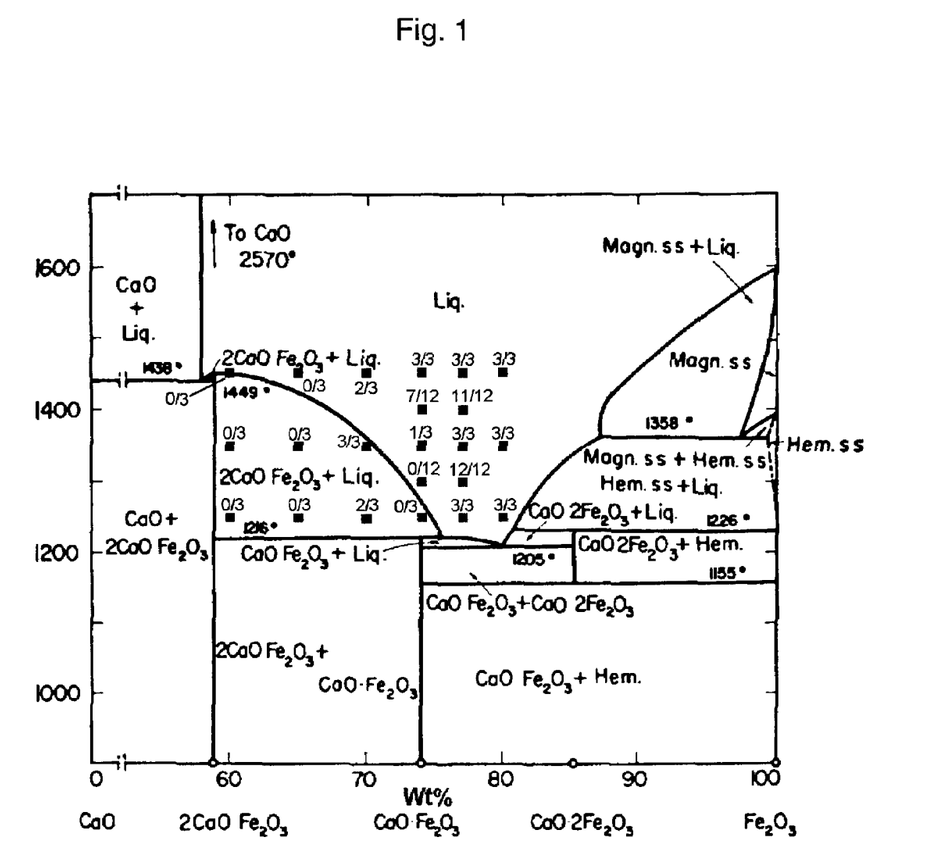
FIG. 1 is a phase diagram of the system $CaO$—$Fe_2O_3$ overlaid with a grid depicting the flux compositions and joining temperatures used for the transient liquid phase joining examples discussed herein, and with the numbers of joints for each example that were hermetic to helium.

The sufficient amount of liquid phase is typically obtained by choosing a low melting point composition within a phase diagram of the oxides contained in the joint material. The low melting point composition may comprise additional metals not contained in the first and second multicomponent metallic oxides. Suitable compositions and phase diagrams can be easily determined by the skilled worker taking into account size, valences and coordination of the respective metal cations. The low melting point composition can be used as such or can be admixed with another more refractory compound or mixture of compounds to give the joint material which provides the desired amount of liquid and solid phase. Exemplary phase diagrams are shown in appended FIGS. 1 and 2, which were taken from B. Phillips and A. Muan, J. Am. Ceram. Soc., 41(11) 445–454 (1958) and N. M. Hwang, R. S. Roth and C. J. Rawn, J. Am. Ceram. Soc., 73 [8] p. 2531–33 (1990), respectively.

The joint material is formed by mixing the respective metal oxides in the desired quantities according to known ceramic procedures, optionally adding binders and plasticizers known in the art.

Heating conditions and powder compositions are preferably selected such that the joint becomes completely solid at the heat treatment temperature. Heating is preferably carried out in conventional equipment used for sintering and up to the above temperature range. After heating, the sintered bodies are held in step (iii) at the temperature for a sufficient time to allow for formation of the joint and especially to allow for the liquid phase to be consumed. Suitable holding times can be determined depending on the composition, the size of the interface and the volume of liquid phase as well as the speed of the reaction. Typical holding times are in the range of about 5 minutes to about 24 hours, preferably 1 to 4 hours. Heating can be conducted in a variety of atmospheres, and is preferably conducted in an atmosphere, such as air, that is not harmful to the sintered bodies. Reducing and/or oxidizing atmospheres are not required as in certain prior art methods.

In a preferred embodiment of the method of the invention the first, the second and, if present, third multicomponent metallic oxide have perovskitic structure. More preferably in this case these multicomponent metallic oxides are the same or different and are independently represented by $$A_xA'_{x'}A''_{x''}B_yB'_{y'}B''_{y''}O_{3-\delta}$$

wherein A is an F-Block lanthanide, La or a mixture thereof; A' is a Group 2 metal; A" is selected from Groups 1, 2 and 3 of the periodic table, and the F-Block lanthanides; B, B' and B" are different from each other and are independently selected from the D-Block transition metals, preferably the first row D-Block transition metals; δ is a number which renders the composition charge neutral; and wherein $0 \leq x \leq 1$; $0 \leq x' \leq 1$; $0 \leq x'' \leq 1$; $0 \leq y \leq 1.1$; $0 \leq y' \leq 1$; and $0 \leq y'' \leq 1.1$; provided that $(x+x'+x'')=1$ and $0.9 \leq (y+y'+y'') \leq 1.1$.

More preferably in the first and second multicomponent metallic oxides at least two out of A, A', A", B, B', and B" are the same and at least two of the indices x, x', x", y, y', and y" meet the following conditions: $|(x_1-x_2)|:x_1 \leq 0.1$ (i.e., the absolute value of the difference between index "x" of the first multicomponent metallic oxide (i.e., $x_1$) and index "x" of the second multicomponent metallic oxide (i.e., $x_2$) divided by $x_1$ is less than or equal to 0.1); $|(x_1'-x_2')|:x_1' \leq 0.1$; $|(x_1''-x_2'')|:x_1'' \leq 0.1$; $|(y_1-y_2)|: y_1 \leq 0.1$; $|(y_1'-y_2')|: y_1' \leq 0.1$; and $|(y_1'-y_2'')|:y_1'' \leq 0.1$.

This means that at least two, more preferably at least three and most preferably all of the indices deviate in the first and second multicomponent metallic oxide by less than 10%.

Most preferably in the third multicomponent metallic oxide at least two out of A, A', A", B, B' and B" are identically contained in the first multicomponent metallic oxide and the second multicomponent metallic oxide, respectively and at least two of the indices x, x', x", y, y', and y" meet the conditions that the respective index of the third multicomponent metallic oxide is identical to one of the indices of the first and second multicomponent metallic oxide or is within a range delimited by the indices of the first and second multicomponent metallic oxide. In similar embodiments, two of the indices x, x', x", y, y' and y" of the third multicomponent metallic oxide ($I_3$ and $I_3'$) have the following relationship to two corresponding indices of the first multicomponent metallic oxide ($I_1$ and $I_1'$) and the second multicomponent metallic oxide ($I_2$ and $I_2'$):

$$I_1 \leq I_3 \leq I_2 \text{ or } I_2 \leq I_3 \leq I_1, \text{ and}$$

$$I_1' \leq I_3' \leq I_2' \text{ or } I_2' \leq I_3' \leq I_1'.$$

In a more preferred embodiment, the first, the second and, if present, the third multicomponent metallic oxide are independently represented by the general formula $$La_xCa_{x'}Fe_yO_{3-\delta}$$

wherein $0.5 \leq x \leq 1$, more preferably $0.5 < x < 0.97$, most preferably $0.5 < x < 0.95$; $0 \leq x' \leq 0.5$, more preferably $0.05 \leq x' \leq 0.5$, and $0.9 \leq y \leq 1.1$, wherein the indices x, x', and y are the same or different for the three multicomponent metallic oxides. Most preferably $x_1 = x_2 = x_3$; $x_1' = x_2' = x_3'$ and $y_1 = y_2$. The joint material may preferably comprise calcia, iron oxide, lanthanum oxide, mixed oxides thereof, and mixtures of the foregoing.

In another preferred embodiment the first, second, and, if present, the third, mixed metallic oxide are independently represented by the formula $$La_xSr_{x'}Co_yCu_{y'}Fe_{y''}O_{3-\delta}$$

wherein $(x+x')=1$, $0 \leq y \leq 1.05$, and $1.0 < (y+y'+y'') \leq 1.05$. In this case, the at least one metal oxide of the joint material is preferably selected from the group consisting of strontia, copper oxide, lanthanum oxide, cobalt oxide, iron oxide, mixtures thereof and mixed oxides of the foregoing.

According to another embodiment of the method of the invention the first, the second, and, if present, the third multicomponent metallic oxide have fluorite structure. More preferably in this case they are independently (i.e., they may be the same or different) represented by $$A_xA'_{x'}A''_{x''}B_yB'_{y'}C_{(1-x-x'-x''-y-y')}O_{2-\delta}$$

wherein A is an F-Block lanthanide (Ln), La or a mixture thereof; A' is a Group 2 or Group 3 metal; A" is an F-Block lanthanide different from A; B, and B' are different from each other and are independently selected from the D-Block transition metals, preferably first row D-Block transition metals; C is selected from the group consisting of Ce, Zr, Hf, Bi, and Th; δ is a number which renders the composition charge neutral; and $0 \leq x \leq 0.3$, $0 \leq x' \leq 0.2$, $0 \leq x'' \leq 0.2$, $0 \leq y \leq 0.2$, and $0 \leq y' \leq 0.2$, provided that $(x+x'+x''+y+y') \leq 0.5$.

More preferably, in this case the first, second and, if present, third multicomponent metallic oxides are independently represented by the general formula $$Ln_xA'_{x'}Ln''_{x''}Ti_yCe_{(1-x-x'-x''-y)}O_{2-\delta}$$

wherein Ln selected from the group consisting of Sm, Gd, Y and mixtures thereof; A' is a Group 2 metal; Ln" is La or a lanthanide different from Sm, Gd, Y; δ is a number which renders the composition charge neutral; and wherein $0.05 \leq x \leq 0.25$; $0 \leq x' \leq 0.03$; $0 \leq x'' \leq 0.25$; $0.001 \leq y \leq 0.03$; $0.05 \leq x+x'' \leq 0.25$ and $0.05 \leq x'+y \leq 0.5$.

In a second aspect the invention relates to a composite structure comprising two of the sintered bodies as defined above, joined by the method of the invention. The joint may be formed at an interface between two flat surfaces, but may also be formed along curved and/or non-even surfaces, such as outer surfaces of the cylindrical body of a tube, etc. Preferably, the joint is hermetic to helium. It is also preferable that the composite structure be free of an interfacial phase, or less preferably, contain an interfacial phase at least as resistant to oxidation and reduction as the first sintered body and the second sintered body.

Preferably the composite structure is an oxygen separation device. Oxygen separation devices are known in the art and are, e.g., described in U.S. Pat. Nos. 5,240,480, 5,534,471, and 5,681,373 and European Patent Application No. 1035072. Typically the sintered bodies in these cases are selected from the group consisting of an ion transport membrane, an electrolyte, an interconnect, a ceramic tube, a support, and seals. These are in general joined tube-to-tube, tube-to-flat-plate or flat-plate-to-flat-plate, respectively, including butt-to-butt, butt-to-circumference and circumference-to-circumference joints.

The invention shall be further illustrated and the objects and advantages thereof will be more clearly understood by reference to the following examples, which are given for illustration purposes only and are not intended to limit the scope of the invention.

EXAMPLES

Preparation of the Joint Material

The six nominal compositions listed in Table 1 were prepared by combining the raw materials ($Fe_2O_3$-Cerac grade 1-1039, $CaCO_3$-GE grade 111-030-026) with spherical Y-TZP zirconia media (Tosoh) in 250-ml Nalgene™ bottles and vibratory-milling in 2-propanol (VWR-Reagent, ACS grade) for 96 hours. The slurries were dried and screened through a 40 mesh sieve before calcining in alumina crucibles at 1000° C. for 8 hours. Following calcination, the powders were vibratory-milled in 2-propanol for another 96 hours using the same media as before. The milled powder was then dried and screened through a 80 mesh sieve. Samples of each powder were submitted for particle size analysis, revealing sub-micron mean particle sizes with D90 less than 2 μm. Slips were prepared by combining the powder with a 4:1 weight ratio of toluene to ethanol, adding a small amount of polyvinyl butyral for a dispersant, and paint shaking for 1 hour in Y-TZP zirconia media. Polyvinyl butyral binder and butyl benzyl phthalate plasticizer were added such that the weight ratio of solvents to polyvinyl butyral was 10:1 and the slip contained 80 volume % solids. The slips were then paint shaken for an additional hour and placed on a roll mill overnight. They were then degassed, resulting in viscosities of 500–550 cP, and cast on silicone-coated polyester at a doctor blade height of 0.039 or 0.123 mm to produce green tape 15 or 45 μm in nominal thickness, respectively.

TABLE 1

Nominal Compositions (wt %)

60% $Fe_2O_3$—40% CaO
65% $Fe_2O_3$—35% CaO
70% $Fe_2O_3$—30% CaO
74% $Fe_2O_3$—26% CaO
77% $Fe_2O_3$—23% CaO
80% $Fe_2O_3$—20% CaO

Examples 1–6

Figure 3A:
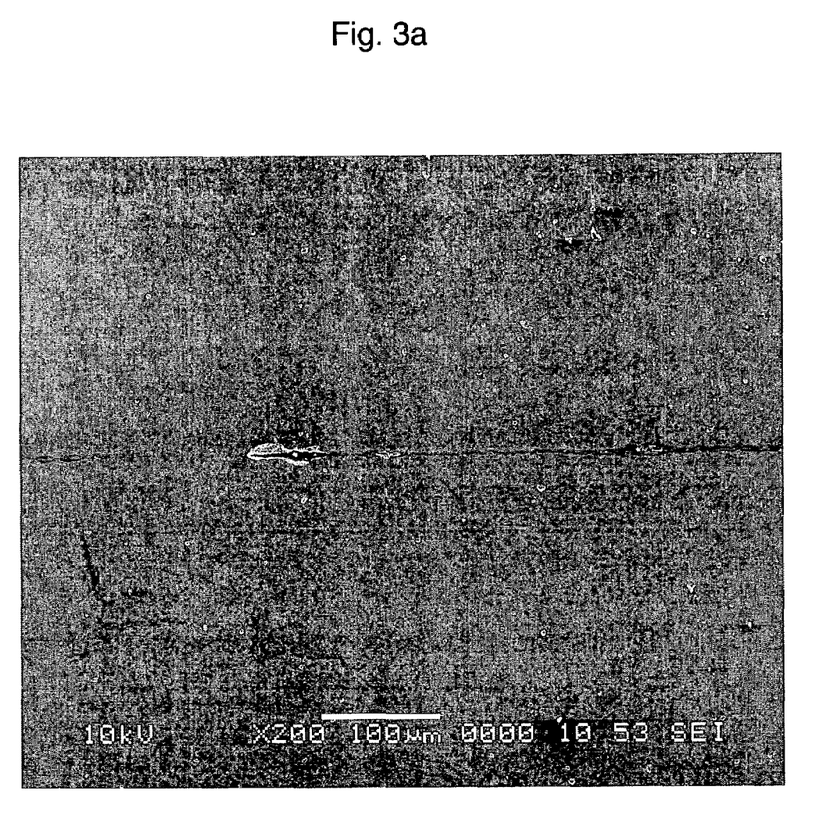
FIGS. 3a and b show scanning electron micrographs (SEMS) of a tube-to-tube joint of the invention showing typical regions of joints fabricated at 1250° C. for 1 hour using 45 μm tape.
Figure 3B:
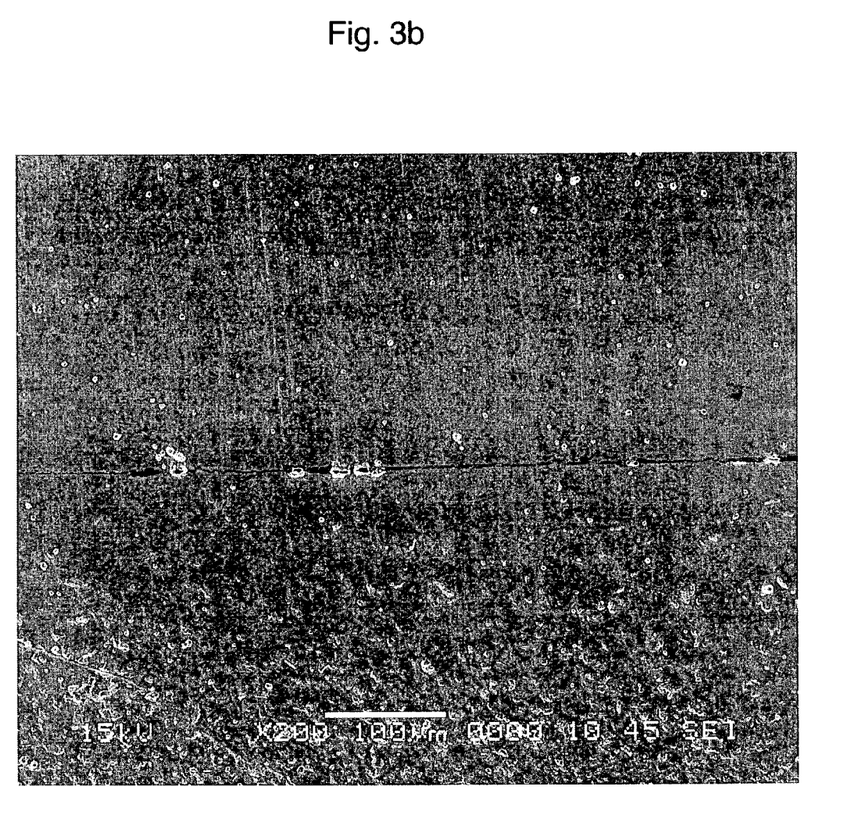

45 μm tapes of the six compositions in Table 1 were sandwiched between silicone-coated polyester and warm-pressed to ensure flatness at 80° C. for 2 minutes using a clamp force of 89 kN. 25 mm discs were punched from the tape and sandwiched between 25 mm discs and rims (to enable leak checking) of dense sintered $(La_{0.75}Ca_{0.25})_{1.01}FeO_{3-x}$(LCF). Each joining sample was placed between setters with a small weight on top for applying pressure on the joint. The samples were joined by heating at 20° C./hour to 150° C., 5° C./hour to 300° C., 60° C./hour to 1250° C., soaking for 1 hour, and then cooling to room temperature at 60° C./hour. Heating above 1250° C. allows the joining composition to form a liquid phase. The results are shown in Table 2. FIGS. 3a and 3b show SEM micrographs of Examples 5 and 6, respectively. In both cases the dark phase at the interfaces and in nearby regions was identified by Energy Dispersive Spectroscopy (EDS) as containing a calcium ferrite phase.

TABLE 2

Joining at 1250° C. for 1 hr

| Example No. | Composition | Approx. Joint Pressure (kPa) | Samples Hermetic to Helium |
|---|---|---|---|
| 1 | 60% $Fe_2O_3$—40% CaO | 1.7 | 0 of 3 |
| 2 | 65% $Fe_2O_3$—35% CaO | 1.7 | 0 of 3 |
| 3 | 70% $Fe_2O_3$—30% CaO | 1.7 | 2 of 3 |
| 4 | 74% $Fe_2O_3$—26% CaO | 1.7 | 0 of 3 |
| 5 | 77% $Fe_2O_3$—23% CaO | 1.7 | 3 of 3 |
| 6 | 80% $Fe_2O_3$—20% CaO | 1.7 | 3 of 3 |

Examples 7 & 8

Both 15 μm and 45 μm tapes of the 74% $Fe_2O_3$—CaO and 77% $Fe_2O_3$—CaO compositions were warm-pressed to achieve flatness as in examples 1–6. Again, 25 mm discs were punched from the tape and sandwiched between ground discs and rims of the same sintered bodies. Half of the samples had a small applied load while the other half had no load. The samples were heated at 20° C./hour to 150° C., 5° C./hour to 300° C., 50° C./hour to 1300° C., soaked at 1300° C. for 10 hours, and cooled to room temperature at 50° C./hour. The results from leak checking the samples are given in Table 3.

TABLE 3

Results from joining at 1300° C. for 10 hours.

| Example No. | Composition | Tape Thickness (μm) | Approx. Joint Pressure (kPa) | Samples Hermetic to Helium |
|---|---|---|---|---|
| 7a | 74% $Fe_2O_3$—26% CaO | 15 | 0.00 | 0 of 6 |
| 7b | 74% $Fe_2O_3$—26% CaO | 45 | 1.7 | 0 of 6 |
| 8a | 77% $Fe_2O_3$—23% CaO | 15 | 0.00 | 6 of 6 |
| 8b | 77% $Fe_2O_3$—23% CaO | 45 | 0.25 | 6 of 6 |

Examples 9–14

Figure 4A:
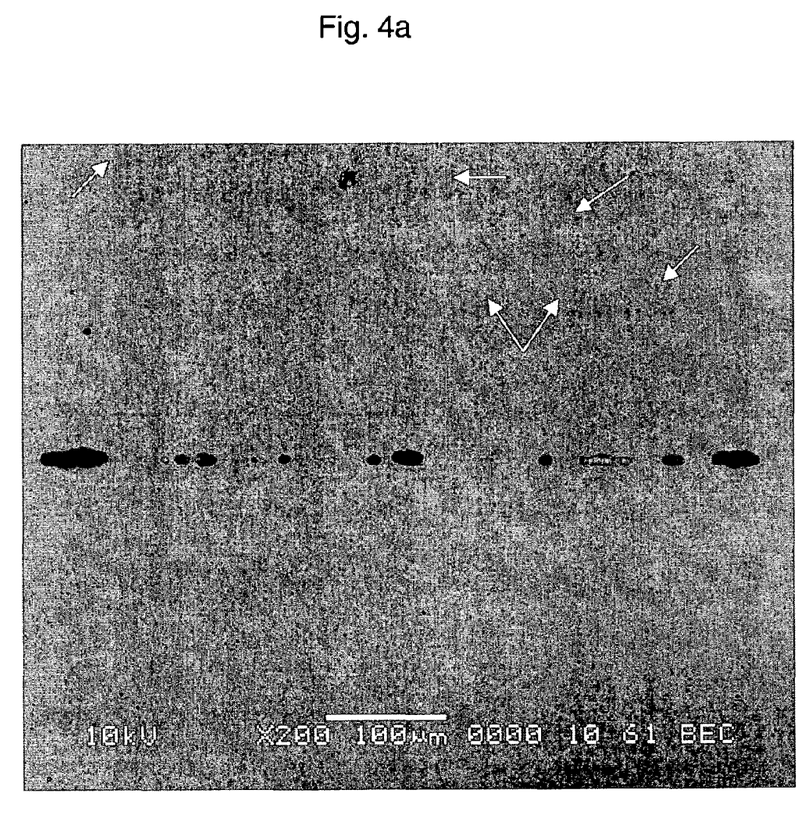
FIGS. 4a and b show SEM micrographs showing typical regions of joints fabricated at 1350° C. for 1 hour using 45 μm tape.
Figure 4B:
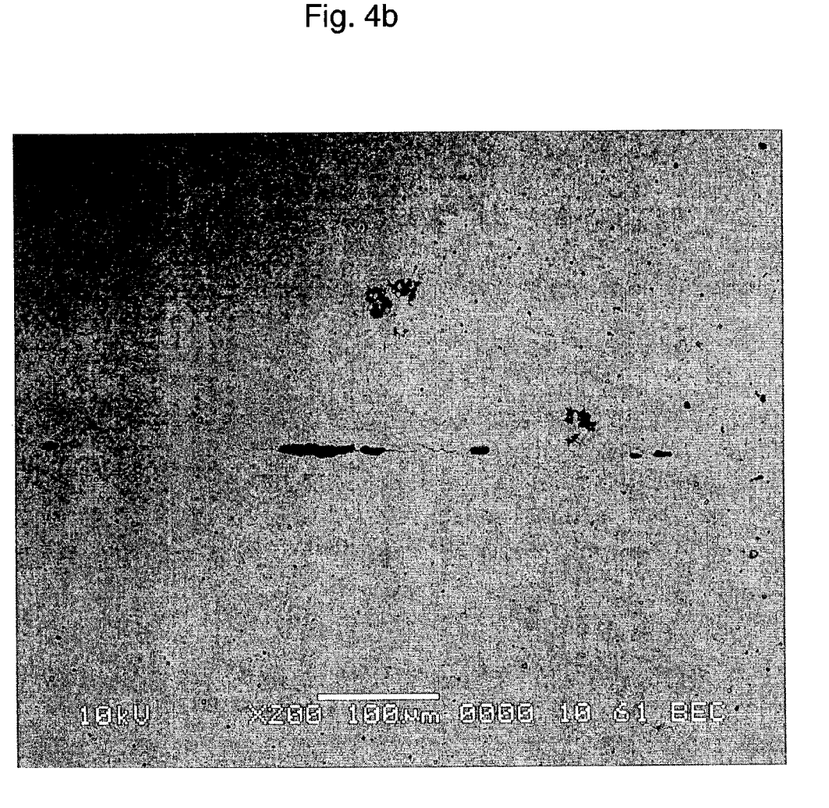

More joints were prepared using 45 μm tape from all six compositions in Table 1 that was warm-pressed to achieve flatness, and sandwiched between sintered, ground LCF-discs and rims. A small load was applied to each of the joints and then they were heated at 20° C./hour to 150° C., 5° C./hour to 300° C., 60° C./hour to 1350° C., soaked at 1350° C. for 1 hour, and cooled to room temperature at 60° C./hour. The results from leak checking the joints are listed in Table 4. FIGS. 4a and 4b show SEM micrographs of Examples 13 and 14, respectively. The dark spots at the interfaces are pores. The arrows indicate regions identified by EDS as containing a calcium ferrite phase.

TABLE 4

Results from joining with 45 μm tape at 1350° C. for 1 hour.

| Example No. | Composition | Approx. Joint Pressure (kPa) | Samples Hermetic to Helium |
|---|---|---|---|
| 9 | 60% $Fe_2O_3$—40% CaO | 1.7 | 0 of 3 |
| 10 | 65% $Fe_2O_3$—35% CaO | 1.7 | 0 of 3 |
| 11 | 70% $Fe_2O_3$—30% CaO | 1.7 | 3 of 3 |
| 12 | 74% $Fe_2O_3$—26% CaO | 1.7 | 1 of 3 |
| 13 | 77% $Fe_2O_3$—23% CaO | 1.7 | 3 of 3 |
| 14 | 80% $Fe_2O_3$—20% CaO | 1.7 | 3 of 3 |

Examples 15 & 16

As in Examples 7 and 8, 15 μm and 45 μm tapes of the 74% $Fe_2O_3$—CaO and 77% $Fe_2O_3$—CaO compositions were warm-pressed to achieve flatness and 25 mm discs were sandwiched between ground discs and rims of the sintered LCF. Again, half of the samples had a small applied load and the other half did not. These samples were heated at 20° C./hour to 150° C., 5° C./hour to 300° C., 50° C./hour to 1400° C., soaked at 1400° C. for 10 hours, then cooled to room temperature at 50° C./hour. Table 5 lists the leak checking results.

TABLE 5

Results from joining at 1400° C. for 10 hours.

| Example No. | Composition | Tape Thickness (μm) | Approx. Joint Pressure (kPa) | Samples Hermetic to Helium |
|---|---|---|---|---|
| 15a | 74% $Fe_2O_3$—26% CaO | 45 | 0.00 | 6 of 6 |
| 15b | 74% $Fe_2O_3$—26% CaO | 15 | 1.72 | 1 of 6 |
| 16a | 77% $Fe_2O_3$—23% CaO | 45 | 0.00 | 6 of 6 |
| 16b | 77% $Fe_2O_3$—23% CaO | 15 | 1.72 | 5 of 6 |

Examples 17–22

Joints were again prepared from tapes of all six compositions given in Table 1, where 45 μm tape was punched into 25 mm discs and placed between sintered, ground LCF-discs and rims. A small load was applied to each of the joints, which were then heated at 20° C./hour to 150° C., 5° C./hour to 300° C., 60° C./hour to 1450° C., soaked at 1450° C. for 1 hour, then cooled to room temperature at 60° C./hour. The joints were leak checked and the results are listed in Table 6.

TABLE 6

Results from joining with 45 μm tape at 1450° C. for 1 hour.

| Example No. | Composition | Approx. Joint Pressure (kPa) | Samples Hermetic to Helium |
|---|---|---|---|
| 17 | 60% $Fe_2O_3$—40% CaO | 1.7 | 0 of 3 |
| 18 | 65% $Fe_2O_3$—35% CaO | 1.7 | 0 of 3 |
| 19 | 70% $Fe_2O_3$—30% CaO | 1.7 | 2 of 3 |
| 20 | 74% $Fe_2O_3$—26% CaO | 1.7 | 3 of 3 |
| 21 | 77% $Fe_2O_3$—23% CaO | 1.7 | 3 of 3 |
| 22 | 80% $Fe_2O_3$—20% CaO | 1.7 | 3 of 3 |

Examples 23–28

Refractory Joint Material

In this example two sintered bodies (flat plates and/or tubes) of $(La_{0.75}Ca_{0.25})_{1.01}FeO_{3-x}$, having a sintering temperature of 1450° C. were joined. The joint material is selected from a mixture of multicomponent metallic oxides. The low melting point multicomponent metallic oxide providing the liquid phase is selected from the system CaO—$Fe_2O_3$ as above. As can be seen from FIG. 1, in this system at concentrations greater than approximately 59 wt % $Fe_2O_3$ a liquid phase forms at temperatures ranging from 1205 to 1226° C. This temperature is below the above sintering temperature of the lanthanum calcium ferrite having perovskite structure.

The fraction of liquid phase relative to the solid phase can be controlled in this system from near 0 to 100% depending on temperature and the relative concentrations of calcium oxide and iron oxide. The chosen low melting point multicomponent metallic oxide is admixed with a multicomponent metallic oxide comprised of a more refractory compound of the $La_2O_3$—$Fe_2O_3$ system to form the joint material. This joint material is selected such that after reaction a third multicomponent metallic oxide of the type $(La_{0.75}Ca_{0.25})_{1.01}FeO_{3-x}$ is formed. Therefore the respective low melting point multicomponent metallic oxide and the more refractory multicomponent metallic oxide are mixed in proportions that provide the desired net composition of the third multicomponent metallic oxide. Corresponding compositions are given in the following Table 7.

TABLE 7

Low and High Melting-Point metal oxides and the Resultant Joint Material

| Example No. | Nominal Flux Composition | Nominal Refractory Balance Composition | Wt. Ratio Ref. Bal./Flux | Nominal TLP Composition (Flux + Refractory Balance) |
|---|---|---|---|---|
| 23 | CaO—60 wt % $Fe_2O_3$ | $La_2O_3$—32.2 wt % $Fe_2O_3$ | 5.14 | $(La_{0.75}Ca_{0.25})_{1.01}FeO_{3-\delta}$ |
| 24 | CaO—65 wt % $Fe_2O_3$ | $La_2O_3$—30.3 wt % $Fe_2O_3$ | 4.37 | $(La_{0.75}Ca_{0.25})_{1.01}FeO_{3-\delta}$ |
| 25 | CaO—70 wt % $Fe_2O_3$ | $La_2O_3$—27.5 wt % $Fe_2O_3$ | 3.81 | $(La_{0.75}Ca_{0.25})_{1.01}FeO_{3-\delta}$ |
| 26 | CaO—74 wt % $Fe_2O_3$ | $La_2O_3$—24.3 wt % $Fe_2O_3$ | 2.99 | $(La_{0.75}Ca_{0.25})_{1.01}FeO_{3-\delta}$ |
| 27 | CaO—77 wt % $Fe_2O_3$ | $La_2O_3$—20.8 wt % $Fe_2O_3$ | 2.53 | $(La_{0.75}Ca_{0.25})_{1.01}FeO_{3-\delta}$ |
| 28 | CaO—80 wt % $Fe_2O_3$ | $La_2O_3$—15.8 wt % $Fe_2O_3$ | 2.07 | $(La_{0.75}Ca_{0.25})_{1.01}FeO_{3-\delta}$ |

The mixture of powders was processed into a tape as in Examples 1–6. This tape is positioned between the two parts to be joined, i.e., two flat plates or tubes or a flat plate and a tube. The parts were heated to a temperature of 1250° C as in Examples 1–6, which is above the melting point of the CaO—$Fe_2O_3$ compound and below the sintering temperature of the bodies to be joined.

The parts are held at this temperature for 1 hour, which was sufficiently long to allow for formation of the liquid phase and reaction of the liquid phase with the solid phase and the surfaces of the parts to be joined. In this reaction a third multicomponent metallic oxide is formed.

Since the third multicomponent metallic oxide is identical to the first and second multicomponent metallic oxide, the joint formed closely matches the thermal expansion coefficients of the interfacial material within the joint to that of the parts. The joint thus has about the same thermal cycling stability as the parts themselves.

Example 29

Joining Open Ended Ground Tubes $(La_{0.9}Ca_{0.1})_{1.005}FeO_3$ powder was prepared by adding 622.67 grams of $La_2O_3$, 335.12 grams of $Fe_2O_3$, and 42.21 grams of $CaCO_3$ to a vibratory mill containing 7 kilograms cylindrical zirconia milling media and 600.0 grams isopropanol. The slurry was vibratory milled for 48 hours and dried overnight in a fume hood. The dried powder was screened −20 mesh and calcined by heating to 1200° C. and holding for 10 hours, with 100° C./hour ramps to and from the calcining temperature. The surface area of the calcined powder was 1.0 $m^2/g$. The calcined powder was vibratory milled for 72 hours using the same media to charge ratio and amount of 2-propanol as above. The milled slurry was dried overnight and screened −80 mesh. The milled surface area was 6.6 $m^2/g$.

A joining tape was made by adding 920.2 grams of the $(La_{0.9}Ca_{0.1})_{1.005}FeO_3$ powder and 9.2 grams of $Fe_2O_3$ to a one-liter high density polyethylene container containing one kilogram of spherical zirconia media, 242.1 grams of reagent grade toluene, 60.5 grams of denatured ethanol, and 4.65 grams polyvinyl butyral. The slip was put on a paint shaker for 30 minutes. Plasticizer (53.56 grams butyl benzyl phthalate) and binder (48.9 grams of polyvinyl butyral) were added to the slip and it was put back on the paint shaker for an additional hour. The slip was rolled overnight and a viscosity of 1500 mpa-s was measured using a viscometer at 25° C. The slip was then filtered, degassed, and cast on polyester to make dried tape approximately 250 μm thick.

Gaskets with an inner diameter of 8 mm and an outer diameter of 11 mm were sheared out of the tape. Sintered $La_{0.9}Ca_{0.1}Fe_{1.01}O_3$ tubes, as well as $La_{0.85}Ca_{0.15}Fe_{1.01}O_3$ tubes, were ground with a 15 μm diamond wheel and joined by placing a gasket between two tube sections using alpha-terpineol to bond the green gasket to the sintered tube. A pressure of approximately 170 kPa was applied to the tube assemblies while firing between setters. The assemblies were joined in a furnace with 1–2 L/min air using the following schedule: 10° C./hr to 130° C., 5° C./hr 130–150° C., 1° C./hr 150–200° C., 2° C./hr 200–250° C., 5° C./hr 250–300° C., 10° C./hr 300–350° C., 50° C./hr 350–1250° c. (2 hour hold at 1250° C.), and 50° C./hr 1250–20° C. Heating to 1250°C. causes the $Fe_2O_3$ in the joining tape to react with the $(La_{0.9}Ca_{0.1})_{1.005}FeO_3$ in the joining tape to form a small amount of liquid phase. The assemblies were then leak checked and eight of them were annealed by heating to 1400° C. for two hours without any external load in stagnant air using 50° C./hr ramps.

A helium leak checker was used after both the 1250° C. joining run and the 1400° C. annealing cycle. One of the $La_{0.85}Ca_{0.15}Fe_{1.01}O_3$ tube assemblies heated only to 1250° C. and another of the assemblies, which went through the two-stage firing, were examined using the SEM after polishing with diamond paste.

All nine tube assemblies were hermetic to He after firing at 1250° C., as well as at 1400° C.

Example 30

Joining Closed-ended to Open-ended Ground Tubes

Closed-ended $La_{0.9}Ca_{0.1}FeO_3$ tubes were cut orthogonal to the longitudinal direction of the tubes to form open-both-end tubes and closed-one-end caps. The cut ends of the tubes and caps were ground. Gaskets, as described in Example 29, were sheared out of joining tape and the tubes were joined to the caps in exactly the same manner as described in Example 29. The pressure (170 kPa/gasket) was applied by loading three tube assemblies at the same time with refractories placed on top of the setters, which contacted each tube assembly, during the firing that occurred at 1250° C. using the same heating/cooling schedule as given in Example 29. Five out of five tube assemblies made with this method were hermetic to helium at room temperature.

Example 31

Flat Plate to Flat Plate Joint

A ground $La_{0.9}Ca_{0.1}FeO_3$ block was joined to a first ground $La_{0.9}Ca_{0.1}FeO_3$ plate using the joining tape described in Example 29. The block has two through holes to allow gas to pass through it. The first plate is hollow and it has two holes on two opposite faces. The holes on a first face of the plate match the location of the holes on the block. Gaskets (9.5 mm i.d. by 15.8 mm o.d.) were sheared from the green joining tape and the tape was loaded with 245 kPa pressure. The module was heated at 5° C./hr 20–350° C., 60° C./hr 350–1250° C. (10 hour hold at 1250° C.), and cooled at 60° C./hr from 1250° C. to 20° C. The leak rate was below 0.01 sccm on each port. A second $La_{0.9}Ca_{0.1}FeO_3$ plate was then joined to the first plate, after grinding both joining surfaces flat, using gaskets (7.9 mm i.d. by 12.7 mm o.d.) from the joining tape. The second plate is hollow and it has two holes on one surface that match the location of the holes on the second face of the first plate. Since the plate is hollow, the holes in the second plate are in flow communication with each other. Pressure (270 kPa) was applied to the seals and the same heating/cooling schedule was used as for the block to first plate joint. The leak rate of the entire module consisting of the block, the first plate and the second plate was 0.035 sccm. This is a very low leak rate.

Example 32

Joining Lanthanum Strontium Cobalt Oxides

In this example two sintered bodies made from lanthanum strontium cobalt oxide were joined.

A tape of the joint material was made as in Examples 1–6. The liquid phase is provided by a low melting point multicomponent metallic oxide selected from the SrO—CuO system. Likewise, materials selected from the $La_2O_3$—CuO or $La_2O_3$—SrO—CuO systems could be used. These low melting point materials are combined with a more refractory multicomponent metallic oxide from the system $La_2O_3$—SrO—CuO, to form the joint material.

Figure 2:
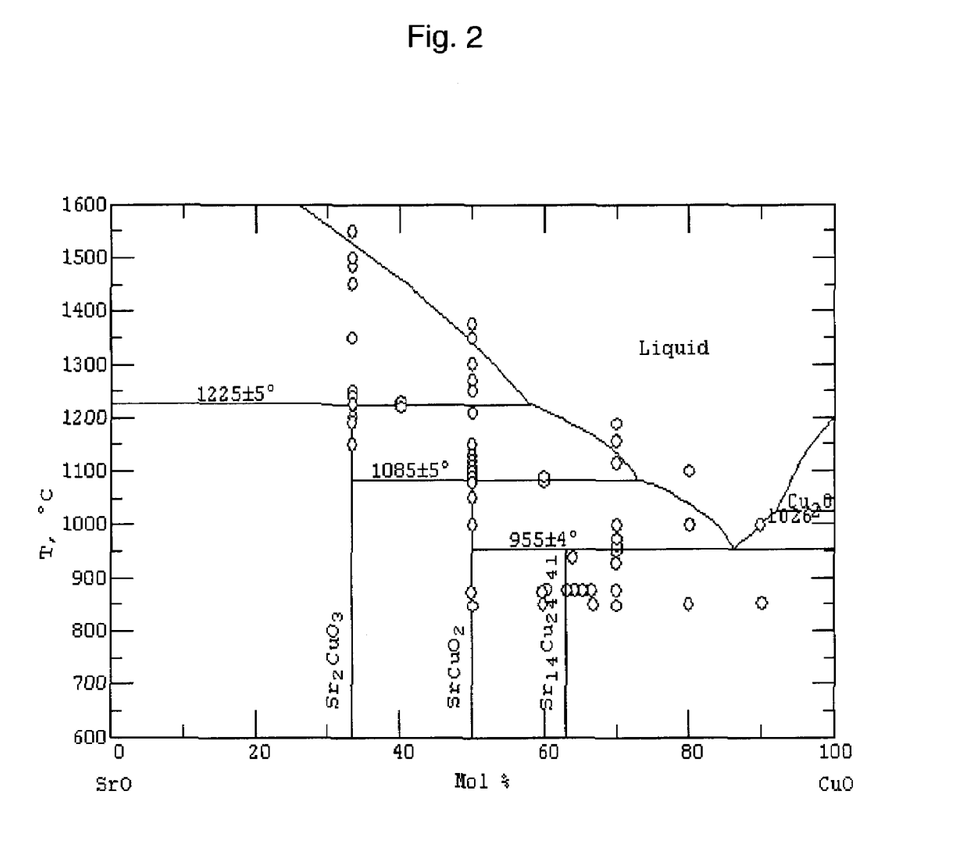
FIG. 2 is a phase diagram of the system SrO—CuO.

As shown in FIG. 2, in the SrO—CuO system compositions exist with melting points of 1060° C. and 955° C., respectively. As in Examples 23–28, the mixture of low melting point metal oxide and more refractory multicomponent metallic oxide is formed into a tape as the joint material. The tape is positioned between the two parts to be joined. Thereafter the parts are heated to a temperature above the melting point and below the sintering temperature of the sintered bodies to be joined (1200° C.). The parts are held at this temperature for 4 hours, which is sufficient to allow for formation of the liquid and for sintering reaction of the liquid phase. Thereafter the parts are cooled.

As in Examples 1–6, a joint is formed which closely matches the thermal and chemical expansion coefficients of the interfacial material to that of the part. The joint thus has nearly the same thermal cycling stability as the parts themselves.

While the invention has been described in detail and with reference to specific examples thereof, it will be apparent to one skilled in the art that various changes and modifications can be made therein without departing from the spirit and scope thereof.

We claim:

1. A method of joining at least two sintered bodies to form a composite structure, said method comprising:
    providing a first sintered body comprising a first multicomponent metallic oxide having a first crystal structure selected from the group consisting of a perovskitic structure and a fluorite structure;
    providing a second sintered body comprising a second multicomponent metallic oxide having a second crystal structure identical to the first crystal structure;
    applying at an interface between the first sintered body and the second sintered body a joint material comprising at least one metal oxide, wherein (i) the at least one metal oxide comprises at least one shared metal contained in at least one of the first multicomponent metallic oxide and the second multicomponent metallic oxide; (ii) the joint material is free of boron, silicon, germanium, tin, lead, arsenic, antimony, phosphorus and tellurium; and (iii) the at least one metal oxide has a melting point below a lower of a first sintering temperature of the first multicomponent metallic oxide and a second sintering temperature of the second multicomponent metallic oxide; and
    heating the first sintered body, the second sintered body and the joint material to a joining temperature above the melting point of the joint material and below the lower of the first sintering temperature and the second sintering temperature for a period of time sufficient to form a joint between the first sintered body and the second sintered body and thereby provide the composite structure.

2. The method of claim 1, wherein the joint comprises a third multicomponent metallic oxide having a third crystal structure identical to the first crystal structure and the second crystal structure.

3. The method of claim 1, wherein the at least one metal oxide forms a liquid phase and at least one solid phase upon heating to the joining temperature.

4. The method of claim 3, wherein the liquid phase and the at least one solid phase react to form the joint.

5. The method of claim 1, wherein at least two metals in the first multicomponent metallic oxide are also in the second multicomponent metallic oxide.

6. The method of claim 2, wherein at least two metals in the first multicomponent metallic oxide are also in the second multicomponent metallic oxide.

7. The method of claim 6, wherein the third multicomponent metallic oxide comprises at least two metals contained in the first multicomponent metallic oxide and at least two metals contained in the second multicomponent metallic oxide.

8. The method of claim 1, wherein the first and second crystal structures consist of one member selected from the group consisting of a perovskitic structure and a fluorite structure.

9. The method of claim 1, wherein the joint is selected from the group consisting of a tube-to-tube joint, a flat-plate-to-tube joint and a flat-plate-to-flat-plate joint.

10. The method of claim 1, wherein the first multicomponent metallic oxide and the second multicomponent metallic oxide are independently represented by $$A_xA'_{x'}A''_{x''}B_yB'_{y'}B''_{y''}O_{3-\delta}$$

wherein A is an F-Block lanthanide, La or a mixture thereof; A' is a Group 2 metal; A'' is an F-Block lanthanide or an element of Periodic Table Group 1, 2 or 3; B, B' and B'' are different from each other and are independently selected from D-Block transition metals; δ is a number which renders a composition charge neutral; and wherein $0 \leq x \leq 1$; $0 \leq x' \leq 1$; $0 \leq x'' \leq 1$; $0 \leq y \leq 1.1$; $0 \leq y' \leq 1$; and $0 \leq y'' \leq 1.1$; provided that $(x+x'+x'')=1$ and $0.9 \leq (y+y'+y'') \leq 1.1$.

11. The method of claim 10, wherein at least two metals in the first multicomponent metallic oxide are also in the second multicomponent metallic oxide and at least two of indices x, x', x'', y, y', and y'' meet the following conditions: $|(x_1-x_2)|{:}x_1 \leq 0.1$; $|(x_1'-x_2')|{:}x_1' \leq 0.1$; $|(x_1''-x_2'')|{:}x_1'' \leq 0.1$; $|(y_1-y_2)|{:}y_1 \leq 0.1$; $|(y_1'-y_2')|{:}y_1' \leq 0.1$; and $|(y_1''-y_2'')|{:}y_1'' \leq 0.1$, where each subscript 1 refers to the first multicomponent oxide and each subscript 2 refers to the second multicomponent oxide.

12. The method of claim 11, wherein the joint comprises a third multicomponent metallic oxide having a third crystal structure identical to the first crystal structure and the second crystal structure, and two of the indices x, x', x'', y, y' and y'' of the third multicomponent metallic oxide ($I_3$ and $I_3'$) have the following relationship to two corresponding indices of the first multicomponent metallic oxide ($I_1$ and $I_1'$) and the second multicomponent metallic oxide ($I_2$ and $I_2'$):

$$I_1 \leq I_3 \leq I_2 \text{ or } I_2 \leq I_3 \leq I_1, \text{ and}$$

$$I_1' \leq I_3' \leq I_2' \text{ or } I_2' \leq I_3 \leq I_1'.$$

13. The method of claim 10, wherein the first multicomponent metallic oxide and the second multicomponent metallic oxide are independently represented by the formula $$La_xCa_{x'}Fe_yO_{3-\delta}$$

wherein $0.5 \leq x \leq 1$, $0 \leq x' \leq 0.5$ and $0.9 \leq Y \leq 1.1$.

14. The method of claim 13, wherein the joint material comprises a material selected from the group consisting of calcia, iron oxide, lanthanum oxide, mixed oxides thereof and mixtures of the foregoing, and $0.5 \leq x \leq 0.97$ and $0.03 \leq x' \leq 0.5$.

15. The method of claim 10, the joint optionally comprises a third multicomponent metallic oxide having a third crystal structure identical to the first crystal structure and the second crystal structure, and wherein the first, second, and, if present, the third multicomponent metallic oxide are independently represented by the general formula $$La_xSr_{x'}Co_yCu_{y'}Fe_{y''}O_{3-\delta}$$

wherein $(x+x')=1$; $0 \leq y \leq 1.05$; and $0.95 < (y+y'+y'') \leq 1.05$, and the joint material is selected from the group consisting of lanthanum oxide, copper oxide, strontia, cobalt oxide, iron oxide, mixed oxides thereof and mixtures of the foregoing.

16. A method of claim 1, wherein: (a) the joint optionally comprises a third multicomponent metallic oxide having a third crystal structure identical to the first crystal structure and the second crystal structure, and (b) the first, the second, and, if present, the third multicomponent metallic oxide are identical or different and are independently represented by $$A_xA'_{x'}A''_{x''}B_yB'_{y'}C_{(1-x-x'-x''-y-y')}O_{2-\delta}$$

wherein A is an F-Block lanthanide (Ln), La or a mixture thereof; A' is a Group 2 or Group 3 metal; A'' is an F-Block lanthanide different from A; B, and B' are different D-Block transition metals; C is a member selected from the group consisting of Ce, Zr, Hf, Bi, and Th; δ is a number which renders the composition charge neutral; $0 \leq x \leq 0.3$; $0 \leq x' \leq 0.2$; $0 \leq x'' \leq 0.2$; $0 \leq y \leq 0.2$; and $0 \leq y' \leq 0.2$, provided that $(x+x'+x''+y+y') \leq 0.5$.

17. The method of claim 16, wherein the first and second multicomponent metallic oxides comprise at least two identical metals and two of indices x, x', x'', y, and y' of the third multicomponent oxide ($I_3$ and $I_3'$) have the following relationship to two corresponding indices of the first multicomponent oxide ($I_1$ and $I_1'$) and the second multicomponent oxide ($I_2$ and $I_2'$):

$$I_1 \leq I_3 \leq I_2 \text{ or } I_2 \leq I_3 \leq I_1, \text{ and}$$

$$I_1' \leq I_3' \leq I_2' \text{ or } I_2' \leq I_3' \leq I_1'.$$

18. The method of claim 17, wherein the first and the second multicomponent metallic oxides are independently represented by the general formula $$Ln_x A'_{x'} Ln''_{x''} Ti_y Ce_{(1-x-x'-x''-y)} O_{2-\delta}$$

wherein Ln is a member selected from the group consisting of Sm, Gd, Y and mixtures thereof; A' is a Group 2 metal; Ln'' is La or a lanthanide other than Sm, Gd, and Y; and wherein $0.05 \leq x \leq 0.25$; $0 \leq x' \leq 0.03$; $0 \leq x'' \leq 0.25$; $0.001 \leq y \leq 0.03$; $0.05 \leq x + x'' \leq 0.25$ and $0.001 \leq y + x' \leq 0.03$.

19. The method of claim 1, wherein the joint is hermetic to helium.

20. The method of claim 1, conducted under no applied pressure.

21. The method of claim 1, wherein the heating is conducted in air.

22. The method of claim 1, wherein the composite structure is free of an interfacial phase.

23. The method of claim 1, wherein the joint comprises an interfacial phase at least as resistant to oxidation and reduction as the first sintered body and the second sintered body.

24. The method of claim 1, wherein the joint material further comprises at least one organic binder.

25. The method of claim 24, wherein the joint material has sufficient plasticity prior to said heating to conform to a shape of the interface between the first sintered body and the second sintered body.

26. The method of claim 1, wherein pressure is applied to the sintered bodies to be joined to produce a joint pressure of 0.001 to 1 MPa at the joint.

* * * * *

UNITED STATES PATENT AND TRADEMARK OFFICE
CERTIFICATE OF CORRECTION

PATENT NO. : 7,094,301 B2 Page 1 of 1
APPLICATION NO. : 10/393564
DATED : August 22, 2006
INVENTOR(S) : Darryl Paul Butt et al.

It is certified that error appears in the above-identified patent and that said Letters Patent is hereby corrected as shown below:

In the Claims

Column 20, line 11, delete Claim 23 in its entirety.

Signed and Sealed this

Twenty-first Day of November, 2006

JON W. DUDAS
*Director of the United States Patent and Trademark Office*